United States Patent
Adams et al.

(10) Patent No.: US 6,674,766 B1
(45) Date of Patent: Jan. 6, 2004

(54) METHOD AND APPARATUS FOR PLUG-AND-SHIFT PACKING OF TIME SLOTS

(75) Inventors: Benjamin Joseph Adams, St. Charles, IL (US); Phil Maurice Berger, Aurora, IL (US); Antoinette Irene Hart, Winfield, IL (US); William Len-fong Siu, Naperville, IL (US); Hui Charles Tang, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 749 days.

(21) Appl. No.: 09/589,004

(22) Filed: Jun. 7, 2000

(51) Int. Cl.[7] .......................... H04B 7/212; H04L 12/43
(52) U.S. Cl. ........................................ 370/458; 370/442
(58) Field of Search ................................ 370/321, 314, 370/329, 341, 347, 431, 442, 471, 458

(56) References Cited

U.S. PATENT DOCUMENTS 4,510,596 A * 4/1985 Hartmann et al. ............ 370/58

FOREIGN PATENT DOCUMENTS

| DE | 4431541 A | 4/1995 |
|---|---|---|
| EP | 0702307 A | 3/1996 |
| EP | 0836143 A | 4/1998 |

* cited by examiner

Primary Examiner—Wellington Chin
Assistant Examiner—Brenda Pham

(57) ABSTRACT

An apparatus and method for packing a data bus by moving ports that are associated with assigned time slots from a first set of time slots to a second set of time slots on the data bus. After all the time slots that can be moved are moved, the remaining time slots are shifted on the data bus resulting in larger contiguous groupings of time slots.

16 Claims, 4 Drawing Sheets

FIG. 3
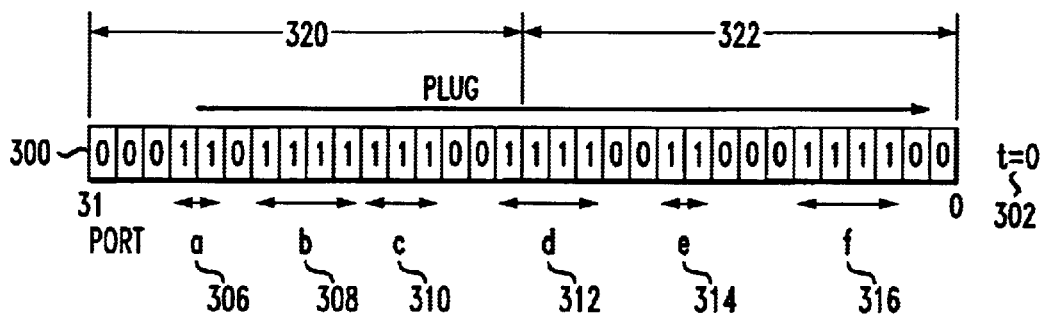
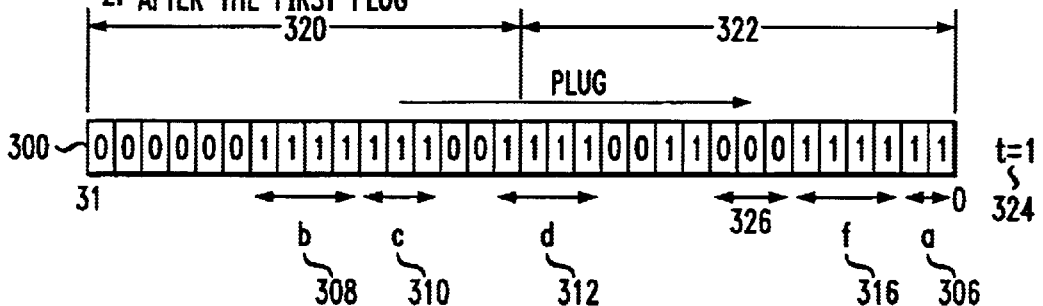
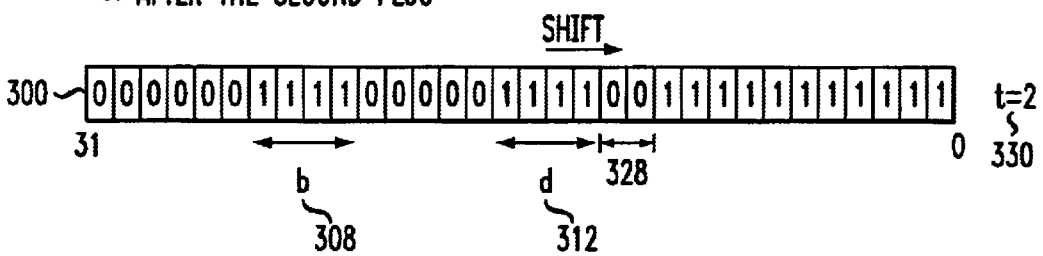
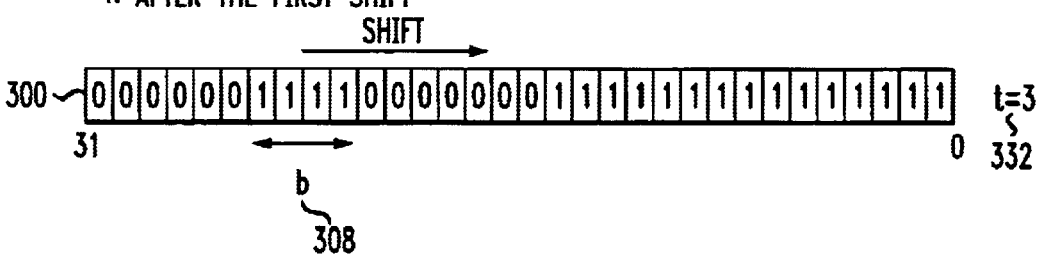
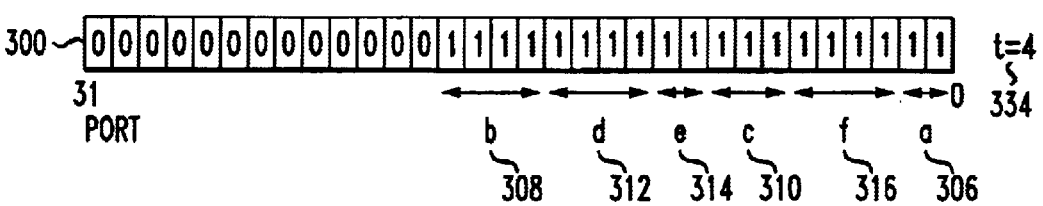

METHOD AND APPARATUS FOR PLUG-AND-SHIFT PACKING OF TIME SLOTS

BACKGROUND OF THE INVENTION

This invention relates to data bus time slot assignment, and in particular, to packing of assigned data bus time slots.

Computer and communication devices have packet handler data buses (PHDBs). The PHDBs allow individual time slots or groups of time slots to be dynamically assigned and released as required. As time slots are assigned and released, the PHDB has non-contiguous free time slots (commonly called "holes") interspersed between assigned time slots. Thus, a port assignment request requiring a plurality of contiguous time slots may not be serviced because of multiple "holes" of unassigned time slots interspersed between the assigned time slots.

In FIG. 1, an illustration of a thirty-two time slot data bus 100 as known in the art is shown. The time slots are assigned identifiers with time slot zero 102 being first (least significant time slot) and time slot thirty-one 104 being last (most significant time slot). A time slot in the data bus is defined as the smallest switchable data unit on a data bus. Multiple contiguous time slots can be grouped together allowing higher data bandwidths to be transferred across the data bus.

Turning to FIG. 2, an illustration of a data fan-out device 202 with multiple packet interface data buses (DFMP) is shown. The fan-out device has access to multiple data buses 204–210 via one of sixteen packet handlers 212–218. The digital fan-out 202 is coupled electronically to the sixteen data buses 204–210. A data bus time slot must pair with a nibble bus time slot in order to be utilized in the DFMP embodiment. However, there are only 8 nibble bus time slots available for 16 data bus time slots at each column. In an alternate embodiment a data fan-out type 11 device is coupled to multiple data buses and does not require nibble bus time slot pairings as in the DFMP embodiment.

To accommodate the contraints from the nibble bus an optimal assignment of time slots on an even data bus 204 has the lowest time slots assigned (shown as 1) and the upper timeslots unassigned (shown as 0). The odd data bus 206 has the opposite time slot assignments. The lowest time slots are unassigned while the upper time slots are assigned. This even/odd data bus pattern is then repeated for all the other data buses.

Thus, a method and apparatus is needed to pack assigned time slots on a data bus enabling larger blocks of unassigned contiguous time slots to be available for assignment. Additionally, a method and apparatus is also needed to efficiently pack time slots in desirable portions of the DFMP data bus implementation.

SUMMARY OF THE INVENTION

In a system with one or more data buses with each data bus having a plurality of time slots, some of the time slots are assigned and carrying data while other time slots are unassigned. The unassigned time slots are assigned either individually or in groups when additional bandwidth is required. Over time the data buses have unassigned time slots "holes" interspersed with assigned time slots. In an individual data bus embodiment, depending on whether the designation of the data bus is odd or even, packing occurs towards the most significant time slot or the least significant time slot. In an alternate individual data bus embodiment, the data bus is divided into two sets and assigned time slots from the set with fewer assigned time slots are moved or plugged into free time slots in the other set. If the other set of time slots does not have an exactly equal number of contiguous time slots for a port having multiple time slot to be moved or plugged into, then the assigned time slots that follow an unassigned time slot are shifted in that set of time slots. The shifting of time slots results in larger grouping of contiguous time slots in the other set of time slots. In a multi-data bus embodiment, the moving and shifting of time slots occurs between data buses in addition to within one of the data buses.

BRIEF DESCRIPTION OF THE DRAWINGS

The foregoing objects and advantageous features of the invention will be explained in greater detail and others will be made apparent from the detailed description of the present invention, which is given with reference to the several figures of the drawing, in which:

FIG. 3 is a diagram of a data bus at different stages of packing in accordance with an embodiment of the invention;

DETAILED DESCRIPTION

Figure 1:
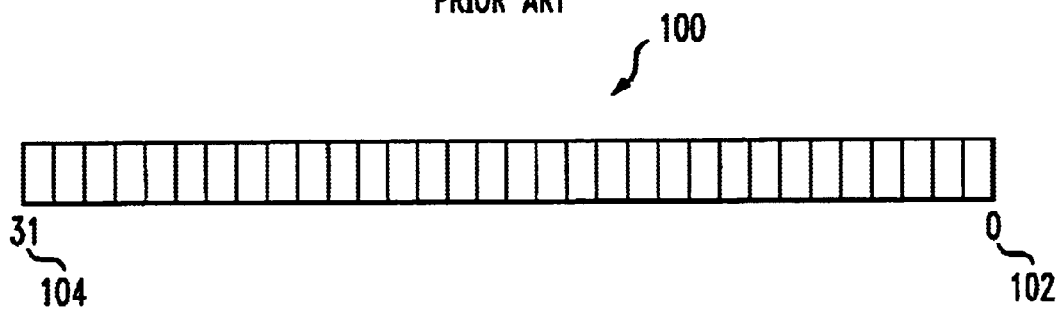
FIG. 1 illustrates a thirty-two time slot data bus as known in the art.
Figure 2:
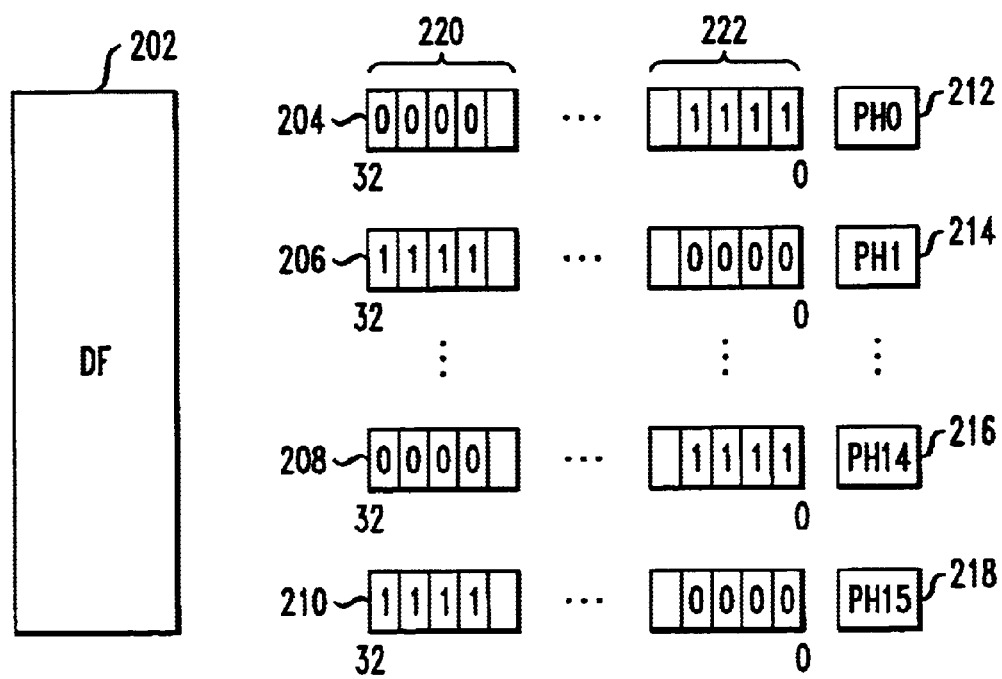
FIG. 2 is an illustration of a data fan-out device with multiple packet interface data bses (DFMP) as known in the art.

In FIG. 3, a diagram of a single DFMP data bus 300 at different stages of packing in accordance with an embodiment of the invention. Because of the DFMP it is advantageous to pack the data bus towards the least significant time slot or most significant time slot depending on the data bus designation as even or odd. The present example in FIG. 3 is an even DFMP bus and it is advantageous to have all the time slots concentrated or packed towards the least significant time slot.

The data bus 300 is identified at the start of packing as t=0 302. The thirty-two time slots of the data bus 300 are either assigned (shown with a 1) or unassigned (shown with a 0). The number of time slots assigned to port "a" 306 is two, "b" 308 is four, "c" 310 is three, "d" 312 is four, "e" 314 is two, and "f" 316 is four. The data bus 300 is divided into two sets. The first set 320 having time slots 16–31 and the second 322 set having time slots 0–15. The first set 320 has ten time slots assigned and the second set 322 has nine timeslots also assigned.

The number of contiguous free time slots in the second set of time slots 322 is determined before identifying a port that requires that number of time slots. Thus, timeslot one and timeslot two are identified as being available. The assigned time slots in the first set of time slots 320 are examined and the first two time slot port is identified. The furthest two time slot port from the least significant side is port "a" 306. Port "a" 306 is then moved or plugged into time slots one and two in the second set of time slots 322.

In an alternate embodiment, the first port 306 is selected and requires two time slots. After selecting the port, the data bus is scanned starting at the least significant time slot for two contiguous unassigned time slots. The scanning locates two unassigned contiguous time slots (time slot one and two) in the second set of time slot 322. Port "a" 306 is moved to time slots one and two as shown at t=1 324.

The next action is determining the next block of contiguous time slots. A contiguous block of three unassigned time slots 326 is identified in the second set of time slots 322. Port "c" 310 requires three time slots, so it is moved or plugged into the three unassigned time slots 326.

The second set of time slots 322 has only two unassigned time slots 328 and port "b" 308 in the first set of time slots 320 requires four time slots. Thus, a move or plug can not occur. Therefore, in order to pack the data bus and increase the number of contiguous time slots, a shift operation occurs.

The port following unassigned time slots are shifted towards the least significant time slot (time slot zero). In the present example, port "d" 312 follows unassigned time slots 328. Therefore, the time slots associated with the port "d" 312 are shifted by two time slots resulting in the data bus at T=3 332.

The next port, port "b" 308 on data bus 300 is shifted towards the least significant time slot. The resulting data bus is shown at t=4 334. In an alternative embodiment, the plugging of the time slots that are associated with port "b" 308 occurs, rather than a shift, resulting once again in a data bus as shown at t=4 334.

Thus, the resulting data bus 300 has assigned time slots concentrated on one side of the data bus. Additionally, a greater number of contiguous time slots are available for assignments to new ports requiring more than one time slot.

Figure 4:
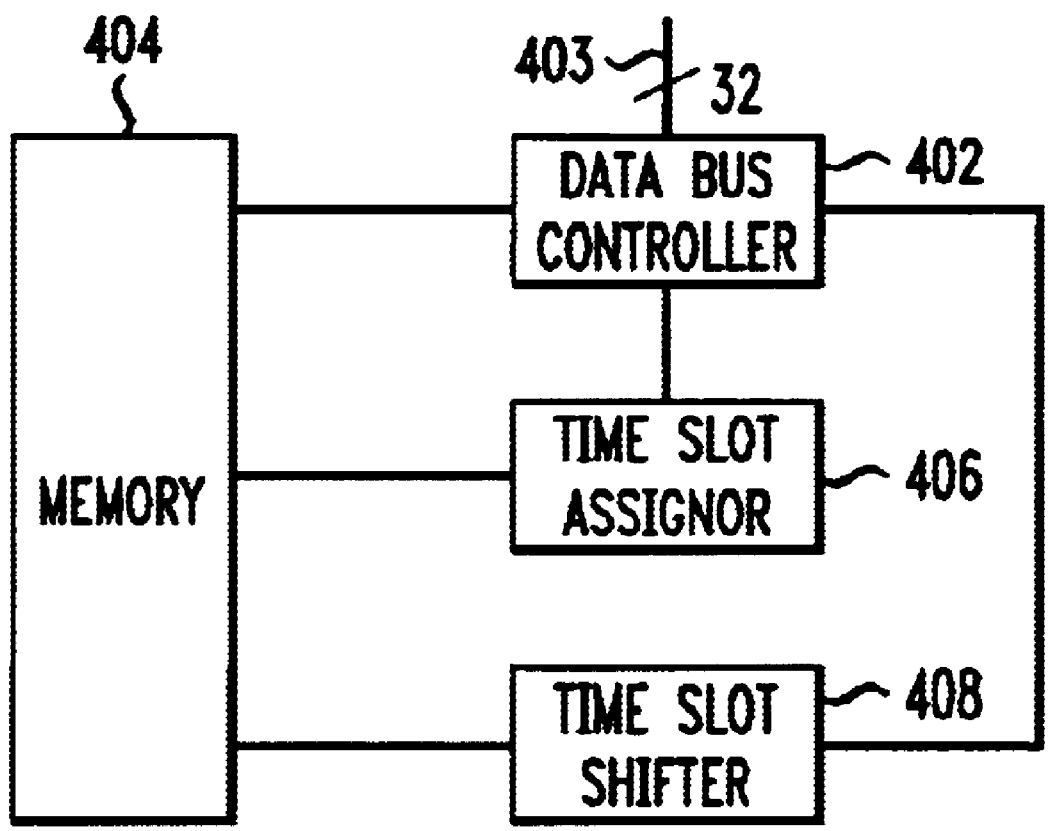
FIG. 4 is a block diagram of an embodiment of the invention.

In FIG. 4, a block diagram of an embodiment of the invention is shown. A data. bus controller (commonly called a controller) 402 is connected to thirty-two time slot data bus 403. A memory 404 is coupled to the data bus controller, a time slot assignor 406 and a time slot shifter 408. The time slot assignor 406 is also coupled to the data bus controller 402. The time slot shifter 408 is similarly coupled to the data bus controller 402.

The data bus controller 402 assigns time slots to ports. A memory 404 contains a table (i.e. array, link list, etc . . . ) of assigned and unassigned data bus time slots. When a predetermined threshold of time slot assignments on the data bus is reached, the data bus controller initiates packing of the data bus. The time slot assignor 406 determines what time slots on the data bus can be moved or plugged from one position to another position on the data bus. The time slot assignor 406 uses the table stored in memory 404 to identify the unassigned and assigned time slots.

After all the time slots are moved as previously discussed above, the assigned time slots are shifted by the time slot shifter 408. The time slot shifter 408 using the table in memory 404 locates a port with associated assigned time slot that follows an at least one unassigned timeslot and shifts the assign port to create a packed data bus and more contiguous unassigned time slots.

Figure 5:
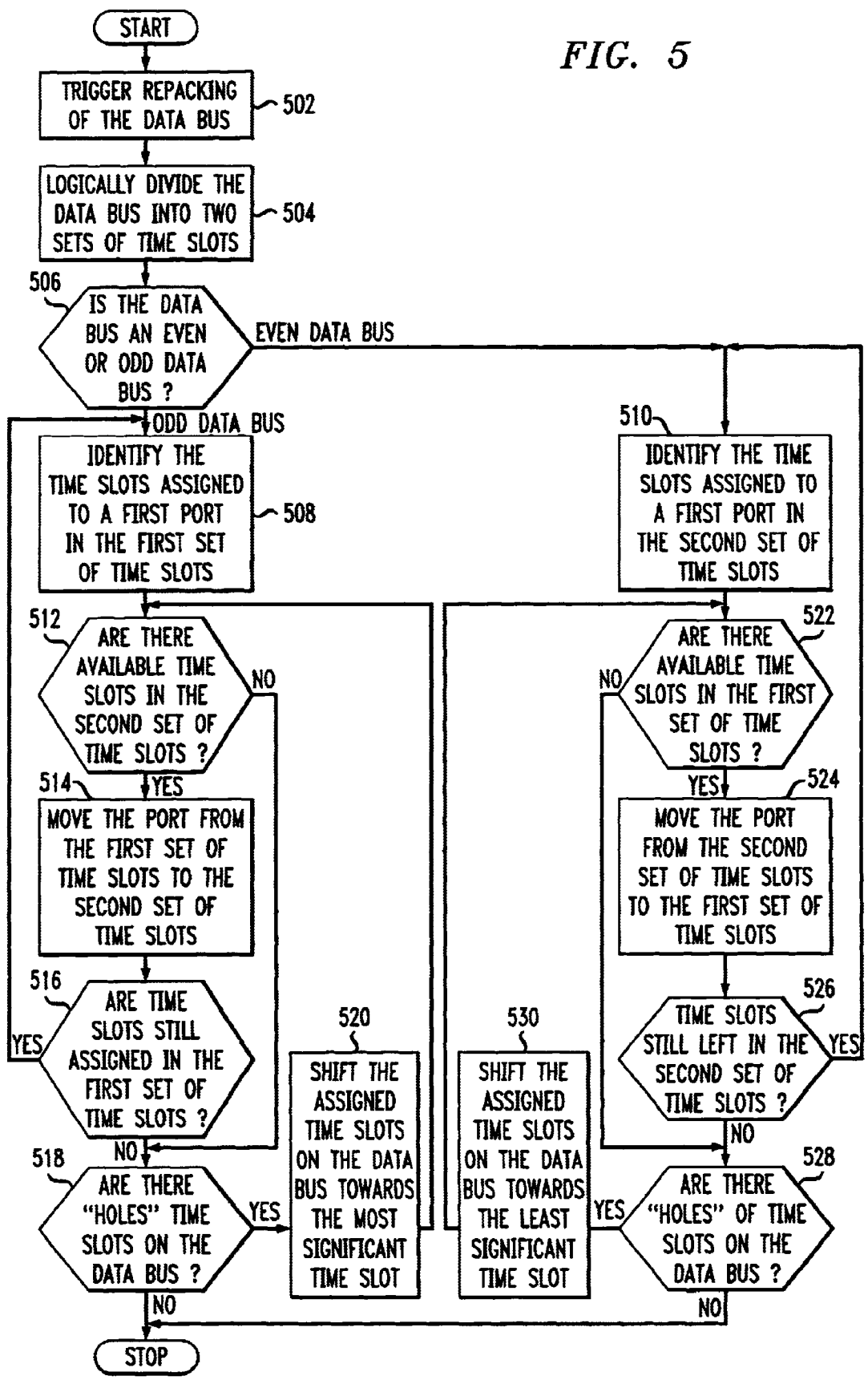
FIG. 5 is a flow diagram of a method of packing a data bus in accordance with an embodiment of the invention.

Turning to FIG. 5, a flow diagram of a method of packing a data bus in accordance with an embodiment of the invention is shown. In step 502, the packing of data bus is triggered by attaining a predetermined threshold of time slot assignments. In the present embodiment, the predetermined threshold is when the number of contiguous time slots from an incoming new request path (port) exceeds the size of the unassigned time slot blocks on the data bus 300, FIG. 3, but less than the sum of all the unassigned time slot blocks. The advantage of this trigger is to postpone the packing operation as late as possible. In alternate embodiments other triggering events, such as timers or percentage of assigned time slots may selectively be used to trigger packing of the data bus.

In step 504, FIG. 5, the data base is divided into at least a first set of time slots 320, FIG. 3, and a second set of time slots 322. The packing of the data base will move ports and their associated time slots from the one set of time slots to the other set of time slots based on the even or odd numbering of the data busses in a multi-bus device. Even data buses will be packed towards the least significant time slot, while odd data buses will be packed towards the most significant time slot. In an alternate embodiment, the set with most assigned time slots is selected to be repacked from the other.

In step 506 the data bus is identified as either an even or odd data bus in a plurality of data buses. If the data bus is an odd data bus, then the packing of the time slots occurs on the most significant time slot side of the data bus and step 508 is executed. If the data bus is an even data bus, then the packing of the time slots occurs on the least significant time slot side of the data bus and step 510 is executed. In an alternate embodiment with a single data bus, the first set of time slots is compared with the second set of time slots in step 506. If the second set of time slots contains more assigned time slots in step 506, then step 508 is executed. Otherwise, if the first set of time slots contains more assigned time slots in step 506, then step 510 is executed.

In step 508, the time slots assigned to a first port in the first set of time slots is identified. The second set of time slots is examined to located unassigned time slots for the port in step 512. If sufficient contiguous time slots are available in the second set of time slots in step 512, then in step 514 the port is moved from the first set of time slots to the second set of time slots (releasing the time slots in the first set of time slots).

In step 516, a check is made to verify if assigned time slots are still present in first set of time slots. If there are no more assigned time slots in the first set of time slots in step 516, then in step 518 a check for "holes" in the second set occurs. If there are assigned time slots in the first set of time slots in step 516, then step 508 is repeated.

If in step 512 there are no available time slots in the second set of time slots for the identified port in step 508 or no assigned time slots in the first set of time slots, then in step 518 a check is made if there are "holes" of unassigned time slots still present on the data bus. If no "holes" of unassigned time'slots are present on the data bus in step 518, then packing of the data bus is complete and processing stops. If in step 518, "holes" of unassigned time slots are available on the data bus, then in step 520 the assigned time slots on the data bus are shifted towards the most significant time slot in step 520. Step 512 is executed again after the shifting of step 520.

If in step 506 the data bus is identified as an even data bus, then in step 510, the time slots assigned to the first port in the second set of time slots is identified. The first set of time slots is examined to located unassigned time slots for the port in step 522. If sufficient contiguous time slots are available in the first set of time slots in step 522, then in step 524 the port is moved from the second set of time slots to the first set of time slots (releasing the time slots in the second set of time slots).

In step 526, a check is made to verify if assigned time slots are still present in second set of time slots. If there are no more assigned time slots in the second set of time slots in step 526, then in step 528, a check for "holes" of unassigned time slots occurs. If there are assigned time slots in the second set of time slots in step 526, then step 510 is repeated.

If in step 522 there are no available time slots in the first set of time slots for the identified port in step 510, then in step 528 a check is made if there are "holes" of unassigned time slots on the data bus. If there are no "holes" of unassigned time slots found on the data bus in step 528, then packing of the data bus is complete and processing stops. If in step 528 "holes" of unassigned time slots are available on the data bus, then in step 530 the assigned time slots on the data bus are shifted in the direction of the least significant time slot. Step 522 is executed again after the shifting of step 530.

The steps illustrated in FIG. 5 may selectively be implemented by computer readable program code, such as UNIX with "C" or "C++", or in integrated circuits. The computer readable program code signals is contained in an article of manufacture such as a compact disk read only memory (CD ROM), floppy disk, magnetic tape, or programmable chip (i.e. PROM, EEPROM, or EPROM).

While the invention has been particularly shown and described with reference to a particular embodiment, it will be understood by those skilled in the art that various changes in form and details may be made therein without departing from the spirit and scope of the invention and it is intended that all such changes come within the scope of the following claims.

What is claimed is:

1. A method of packing a plurality of time slots on a data bus comprising the steps of:
    dividing the plurality of time slots into a first set of, ports and a second set of ports, wherein the first set of ports have a first plurality of assigned time slots and the second set of ports have a second plurality of assigned time slots;
    determining which of the first plurality of assigned time slots and the second plurality of time slots has a majority of assigned time slots along with a group of unassigned time slots and which of the first plurality of time slots and the second plurality of time slots has a minority of assigned time slots;
    moving a port associated with at least one time slot from the minority of assigned time slots to the group of unassigned time slots; and
    shifting at least one assigned time slot from the minority of assigned time slots to an unassigned time slot in the group of unassigned time slots.

2. The method of claim 1 in which the step of moving further comprises the steps of identifying a number of contiguous time slots associated with the port, and
    locating a number of contiguous time slots in the group of unassigned time slots equal to the number of contiguous:time slots associated with the port.

3. The method of claim 1 in which the step of shifting further comprises the step of directing the shift of the at least one assigned time slot towards a nearest edge of the data bus.

4. The method of claim 1 wherein the step of moving is completed before the step of shifting.

5. The method of claim 1 further comprising the step of waiting until a predetermined threshold of the majority of assigned time slots and minority of assigned time slots is reached before execution before the moving or shifting the port.

6. The method of claim 1 wherein the plurality of time slots are a plurality of code division multiple access time slots.

7. The method of claim 1 wherein the plurality of time slots are a plurality of time division multiple access time slots.

8. A computer-readable signal bearing medium having computer readable program code means embodied therein for packing a plurality of time slots on a data bus, comprising:
    means having computer readable program code for dividing the plurality of time slots into a first set of ports and a second set of ports, wherein the first set of ports have a first plurality of assigned time slots and the second set of ports have a second plurality of assigned time slots,
    means having computer readable program code for determining which of the first plurality of assigned time slots and the second plurality of time slots has a majority of assigned time slots along with a group of unassigned time slots and which of the first plurality of time slots and the 'second plurality of time slots has a minority of assigned time slots,
    means having computer readable program code for moving a port associated with at least one time slot from the minority of assigned time slots to the group of unassigned time slots, and
    means having computer readable program code for shifting at least one assigned time slot from the minority of assigned time slots to an unassigned time slot in the group of unassigned time slots.

9. The computer-readable signal bearing medium of claim 8 wherein the moving means further comprising means having computer readable program code for identifying a number of contiguous time slots associated with the port, and
    computer readable program code for locating a number of contiguous time slots in the group of unassigned time slots equal to the number of contiguous time slots associated with the port.

10. The computer-readable signal bearing medium of claim 8 wherein the shifting means further comprising means having computer readable program code for directing the shift of the at least one assigned time slot towards an outside edge of the plurality of time slots, and
    computer readable program code for locating a number of contiguous time slots in the group of unassigned time slots equal to the number of contiguous time slots associated with the port.

11. The computer-readable signal bearing medium of claim 8 wherein the shifting means further comprising means having computer readable program code for directing the shift of the at least one assigned time slot towards a nearest edge of the data bus.

12. The computer-readable signal bearing medium of claim 8 further comprising means for waiting until a predetermined threshold of the majority of assigned time slots and minority of assigned time slots is reached before execution before the moving or shifting the port.

13. An apparatus for packing a data bus divided into a plurality of time slots comprising a:
    a controller that divides the plurality of time slots on a data bus into a first set of time slots and second set of time slots, wherein the first set of time slots has a first subset of assigned time slots and the second set of time slots has a second subset of assigned time slots;
    a memory coupled to the controller;
    a first counter in the memory responsive to the first set of assigned time slots;
    a second counter in the memory responsive to the second set of assigned time slots;

time slot assignor coupled to the memory, and the controller that moves at least one time slot from the first subset of assigned time slots to the second subset of assigned time slots; and a time slot sifter coupled to the memory, and the controller that shifts at least one assigned time slot in the second set of time slots from a first position in the second set of time slots to a second position in the second set of time slots.

14. The apparatus of claim 13 in which the time slot assignor moves at least one time slot from the first subset of assigned time slots to the second subset of assigned time slots in response to the first counter being greater than the second counter.

15. The apparatus of claim 13 in which the controller is additionally responsive to a predetermined trigger condition to initiate packing of the data bus.

16. The apparatus of claim 13 in which the time slot assignor moves at least one time slot from the first subset of assigned time slots to the second subset of assigned time slots in response to the data bus being an even numbered data bus in a plurality of data buses.

* * * * *